US008332892B2

(12) United States Patent
Rafey et al.

(10) Patent No.: US 8,332,892 B2
(45) Date of Patent: Dec. 11, 2012

(54) METHOD AND APPARATUS FOR CONTENT SELECTION IN A HOME MEDIA ENVIRONMENT

(75) Inventors: Richter A. Rafey, Santa Clara, CA (US); Hubert A. Le Van Gong, San Jose, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 999 days.

(21) Appl. No.: 11/056,208

(22) Filed: Feb. 11, 2005

(65) Prior Publication Data

US 2006/0184972 A1    Aug. 17, 2006

(51) Int. Cl.
*G06F 3/00* (2006.01)
*G06F 13/00* (2006.01)
*H04N 5/445* (2006.01)

(52) U.S. Cl. ............... 725/49; 725/51; 725/52; 725/53; 725/59; 725/87; 725/104; 725/134; 725/142

(58) Field of Classification Search .................. 725/74, 725/82, 83, 86, 87, 119
See application file for complete search history.

(56) References Cited

U.S. PATENT DOCUMENTS

| | | | | | |
|---|---|---|---|---|---|
| 5,550,576 | A | * | 8/1996 | Klosterman | 725/46 |
| 5,686,954 | A | * | 11/1997 | Yoshinobu et al. | 725/43 |
| 5,801,787 | A | * | 9/1998 | Schein et al. | 725/43 |
| 6,005,565 | A | * | 12/1999 | Legall et al. | 715/721 |
| 6,219,839 | B1 | * | 4/2001 | Sampsell | 725/40 |
| 6,518,986 | B1 | * | 2/2003 | Mugura | 725/39 |
| 6,892,391 | B1 | * | 5/2005 | Jones | 725/143 |
| 7,073,193 | B2 | * | 7/2006 | Marsh | 725/114 |
| 7,249,147 | B2 | * | 7/2007 | Juszkiewicz | 707/104.1 |
| 7,420,956 | B2 | * | 9/2008 | Karaoguz et al. | 725/88 |
| 2002/0108114 | A1 | * | 8/2002 | Shinohara et al. | 725/46 |
| 2003/0005454 | A1 | * | 1/2003 | Rodriguez et al. | 725/89 |
| 2004/0060063 | A1 | * | 3/2004 | Russ et al. | 725/46 |
| 2004/0117831 | A1 | * | 6/2004 | Ellis et al. | 725/53 |
| 2005/0028208 | A1 | * | 2/2005 | Ellis et al. | 725/58 |
| 2005/0193408 | A1 | * | 9/2005 | Sull et al. | 725/32 |
| 2005/0193414 | A1 | * | 9/2005 | Horvitz et al. | 725/46 |
| 2009/0013348 | A1 | * | 1/2009 | Thomas et al. | 725/37 |

OTHER PUBLICATIONS

Albro, Edward N.; "First Look: MusicMatch Jukebox's Impressive Version 10"; PC World; http://pcworld.about.com/news/Dec072004id118846.htm © 2005 About, Inc. Musicmatch Jukebox—World's best music player; http://www.musicmatch.com/download/plus/jukebox_intro.htm?os=pc%26mode=input%BTD=1&DID= ; © 1998-2005.

* cited by examiner

*Primary Examiner* — Dominic D Saltarelli
*Assistant Examiner* — Jason J Chung
(74) *Attorney, Agent, or Firm* — Samuel S. Lee; Procopio, Cory, Hargreaves & Savitch LLP (57) ABSTRACT

A system for media content selection. In one embodiment, a home entertainment system for accessing content includes a processor for executing instructions adapted for: (i) receiving a request from a user input for selecting a content title; (ii) displaying formats of the content title, with one format stored in a home network and another stored external to the home network; (iii) receiving a request from the user input device to select one of the formats; and (iv) presenting the selected content in the selected format. The content can be a song in a digital format, for example. Selecting the content can include consideration of user preference information and using one or more of: a content manager, a device manager, a network controller, a purchase controller, a device supporter, a content directory, a connection manager, and a digital rights management (DRM) controller. The user input device can include, for example, a remote control device for a home entertainment system.

15 Claims, 4 Drawing Sheets

| Title | Format | Source |
|---|---|---|
| You-Too: Extricate Me | MP3 128k | mp3 Player |
| | wav | D: |
| | MP3 192k | musicnow.com |
| You-Too: In the Name .. | MP3 128k | mp3 Player |
| | MP3 192k | musicnow.com |
| You-Too: Carry Each O. . | MP3 128k | mp3 Player |
| | MP3 192k | musicnow.com |
| NoWaysis: Wonderfall | MP3 128k | mp3 Player |
| | DVD Audio | DVD Player |
| Blue Day: Basketrace | MP3 128k | mp3 Player |
| | wav | D: |

METHOD AND APPARATUS FOR CONTENT SELECTION IN A HOME MEDIA ENVIRONMENT

BACKGROUND

This invention is related in general to consumer electronics systems and more specifically to a method and apparatus for content selection in a home media environment.

One increasingly common form of audio content selection in commercial environments, such as bars or restaurants, involves a "digital jukebox." In a typical digital jukebox, song content can be accessed from a local hard disk stacked with "tracks" or songs, from an Internet server, or from both. Users typically pay one fee for songs found in the digital jukebox local hard disk or pay a higher fee if a requested song is instead found via the Internet. However, such audio content selection systems have not been made suitable for the home media environment. One reason is related to the operating costs of such systems. Another drawback is that many of these conventional systems have unpopular user input devices, such as keyboard entry systems for submitting lists of desired songs.

Another form of content selection, such as for video content selection, includes using a mobile television type device that can connect to the Internet to access audio and/or video content. However, such video content selection products are typically not well suited for accessing content that is already owned by a user because they require a user to perform a number of separate actions in order to access their personal, remotely located content. Accordingly, the user might have to pay to see a movie in a remote location with such a device when the user already owns a copy of the film in DVD form.

SUMMARY OF EMBODIMENTS OF THE INVENTION

One embodiment of the invention allows a user to obtain a content title from an aggregation of different sources. The sources include sources on a home network such as a media center, hard drive, server computer, mp3 player, etc. Sources can also be remotely located and coupled with the home network, or remote or portable access device via the Internet, satellite signals, cable transmissions, etc. One feature filters out repetitions of the same content title that may appear in multiple sources.

Another embodiment allows a user to select from different formats, or versions, of a desired content title. For example, a content title can be the name of a song, a movie or video, a computer game, a data file, executable code (e.g., an application), etc. Different format types can provide different resolutions of a digital version of content, such as a song. Or formats can differ in their encoding standard (MPEG layer 3 (mp3), Sony Electronics' ATRAC encoding, "wav" digital audio, etc.), playback device compatibility (e.g., surround sound, three-dimensional audio, Super Audio, CD, etc.) or the formats can differ in other ways.

The formats for a title can be stored at a source within the user's premises such as devices (e.g., a computer, disk drive, personal digital assistant (PDA), music player, set-top box, media center, etc.) that are interconnected by a home network. Formats can also be obtained from sources that are external to the home network, such as sources that are interconnected by the Internet, by another home network, a campus or corporate local area network (LAN), etc. Sources of content can be provided by any suitable communications link including, for example, broadcast radio and television, streamed audio or image information, fixed computer systems, portable user devices, etc.

In one embodiment, a user is presented with the available multiple formats for a desired title. A display screen is used to indicate the source for the format, properties of the format (e.g., resolution, compatibility) and cost for the format, if any. Additional characteristics of the format can be included such as time to access the format, whether the format can be copied multiple times, the identity of the provider of the format, etc. If obtaining the format requires a purchase, the purchase can be carried out automatically via a pre-established user account, by credit card, etc.

One embodiment of the invention provides a method comprising: receiving a request to access a media content; outputting a menu that shows the media content is available in a plurality of formats, wherein the media content in a first format is stored at a first source in a home network, and wherein the media content in a second format is stored at a second source external to the home network; receiving a selection of one of the plurality of formats; and outputting the media content in the selected format.

Another embodiment of the invention provides an apparatus for accessing content from a plurality of content sources, the apparatus comprising: a processor; a machine-readable medium including instructions executable by the processor for receiving a request to access a media content; outputting a menu that shows the media content is available in a plurality of formats, wherein the media content in a first format is stored at a first source in a home network, and wherein the media content in a second format is stored at a second source external to the home network; receiving a selection of one of the plurality of formats; and outputting the media content in the selected format.

Another embodiment of the invention provides a machine-readable medium including instructions executable by a processor for accessing content from a plurality of content sources, the machine-readable medium comprising: one or more instructions for receiving a request to access a media content; one or more instructions for outputting a menu that shows the media content is available in a plurality of formats, wherein the media content in a first format is stored at a first source in a home network, and wherein the media content in a second format is stored at a second source external to the home network; one or more instructions for receiving a selection of one of the plurality of formats; and one or more instructions for outputting the media content in the selected format.

Embodiments of the invention can provide a content selection approach that facilitates user access to already-owned media while also providing the advantages of a cost-effective commercial digital jukebox type device. Further, purchase and/or presentation of the selected content can be in a seamless manner to the user, based on the user's preferences.

DETAILED DESCRIPTION

Figure 1:
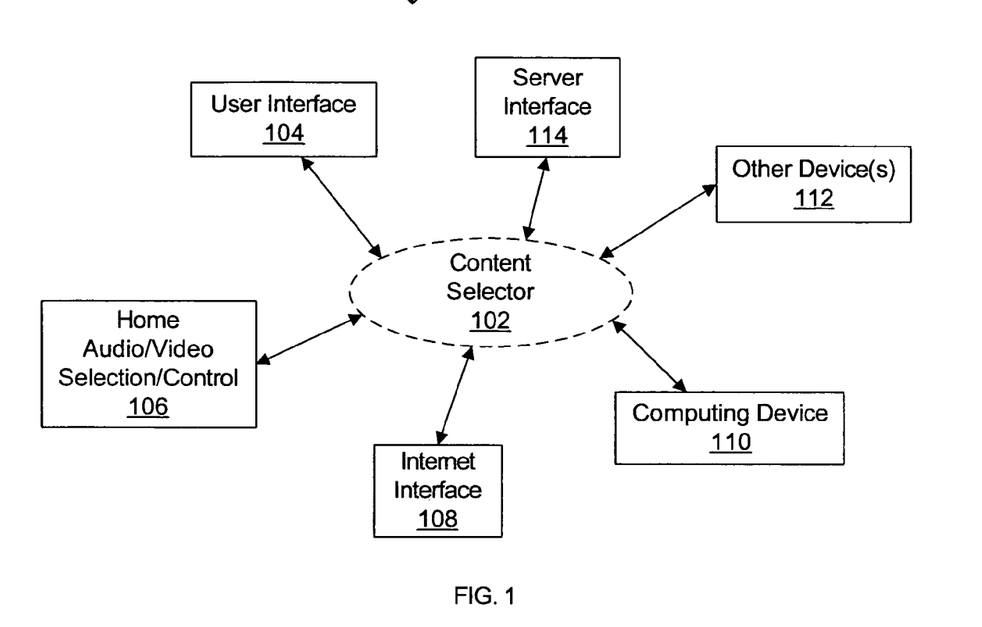
FIG. 1 shows an interface arrangement of the content selector according to an embodiment.

Referring now to FIG. 1, an interface arrangement of the content selector according to an embodiment is shown and indicated by the general reference character 100. In this particular example, Content Selector 102 includes various interfaces, such as User input device 104, Home Audio/Video Selection/Control 106, Internet Interface 108, Computing Device 110, Other Device(s) 112, and Server Interface 114. User input device 104 acts as a user interface and includes touch screen control that may provide cover art images, for example. Variations of user input device 104 include "skinnable" or changeable look and feel views. Further, user input device 104 and Content Selector 102 may be integrated into a single "device." In one example, the device is packaged as a mobile device configured to operate similar to a digital jukebox for selecting audio content. User input device 104 is also configured to show video or other related images during a song request and/or playback, for example. Accordingly, the selected content can include audio or video information. Also, the content output can be controlled by executing a software application, for example.

The display associated with user input device 104 may, when coupled with Internet Interface 108 providing an Internet connection, allow the display to serve as a "Now Playing" section featuring cover art. Further, user input device 104 is based on a digital type of display, so there are many possible variations in the display according to embodiments of the present invention. Also, Internet connectivity allows for tying associated commercial "promotions" that may be of interest to the user. As one example, promotions for new content may be displayed. Such promotions may be for games, or the like, as based on user preferences, a user request list, and/or content found in any one of the user's associated devices. For example, if a user requests songs from the band "U2" and/or owns some U2 content, promotions tied to the release of a new U2 CD are accordingly displayed via user input device 104.

In this arrangement, a user generally requests content, such as a song, from any device connected to or interfaced with Content Selector 102. If the user does not own a copy of the requested content, Internet Interface 108 is used to accommodate purchase of a copy of the content, as will be discussed in more detail below. The purchase and/or presentation of the requested content, which can be selected from a variety of content formants, can be provided to the user in a substantially "seamless" manner, based on the user's preferences. Further, in accordance with various illustrative embodiments, user input device 104 is a user-friendly touch screen or any suitable interface for easily requesting desired content.

Embodiments of the present invention relate to a home entertainment system for accessing content. For example, the system can include a processor configured to execute instructions adapted for: (i) receiving a request from a user input for selecting a content title; (ii) displaying formats of the content title, with one format stored in a home network and another stored external to the home network; (iii) receiving a request from the user input device to select one of the formats; and (iv) presenting the selected content in the selected format. The content can be a song in a digital format, for example. Selecting the content selector can include consideration of user preference information and using one or more of: a content manager, a device manager, a network controller, a purchase controller, a device supporter, a content directory, a connection manager, and a digital rights management (DRM) controller. The user input device can include, for example, a touch screen, or other input device such as a remote control for a home entertainment system.

Figure 2:
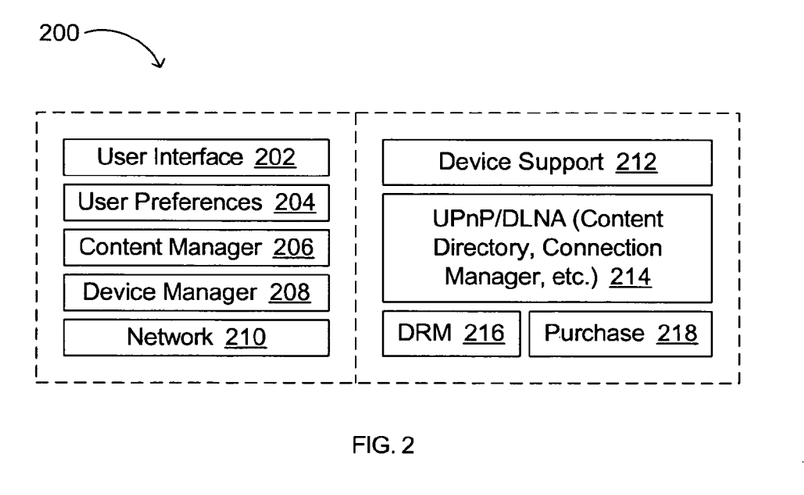
FIG. 2 shows a more detailed architecture of the content selector of FIG. 1.

Referring now to FIG. 2, a more detailed architecture of the content selector of FIG. 1 is shown and indicated by the general reference character 200. Content Selector 200 includes user input device 202, User Preferences 204, Content Manager 206, Device Manager 208, Network 210, Device Support 212, Home Network Middleware 214 (can include, for example, features provided by UPnP/Digital Living Network Alliance (DLNA), Content Directory, Connection Manager, etc.), Digital Rights Management (DRM) 216, and Purchase 218 blocks. User Preferences 204 includes search priority and search parameters used to guide the content selection, as will be discussed in more detail below.

Purchase 218 and DRM 216 may work together where the user has requested DRM-protected content and wishes to purchase a copy via Content Selector 200. Such a copy of the requested content is then made available as part of the user's collection. Further, such content is configured to be stored to any suitable selected device that connects to or otherwise interfaces with Content Selector 200. For example, a song might be downloaded and stored on Computing Device 110 of FIG. 1, which contains a hard disk or other medium suitable for such content storage. Note any desirable DRM system can be supported.

Figure 3:
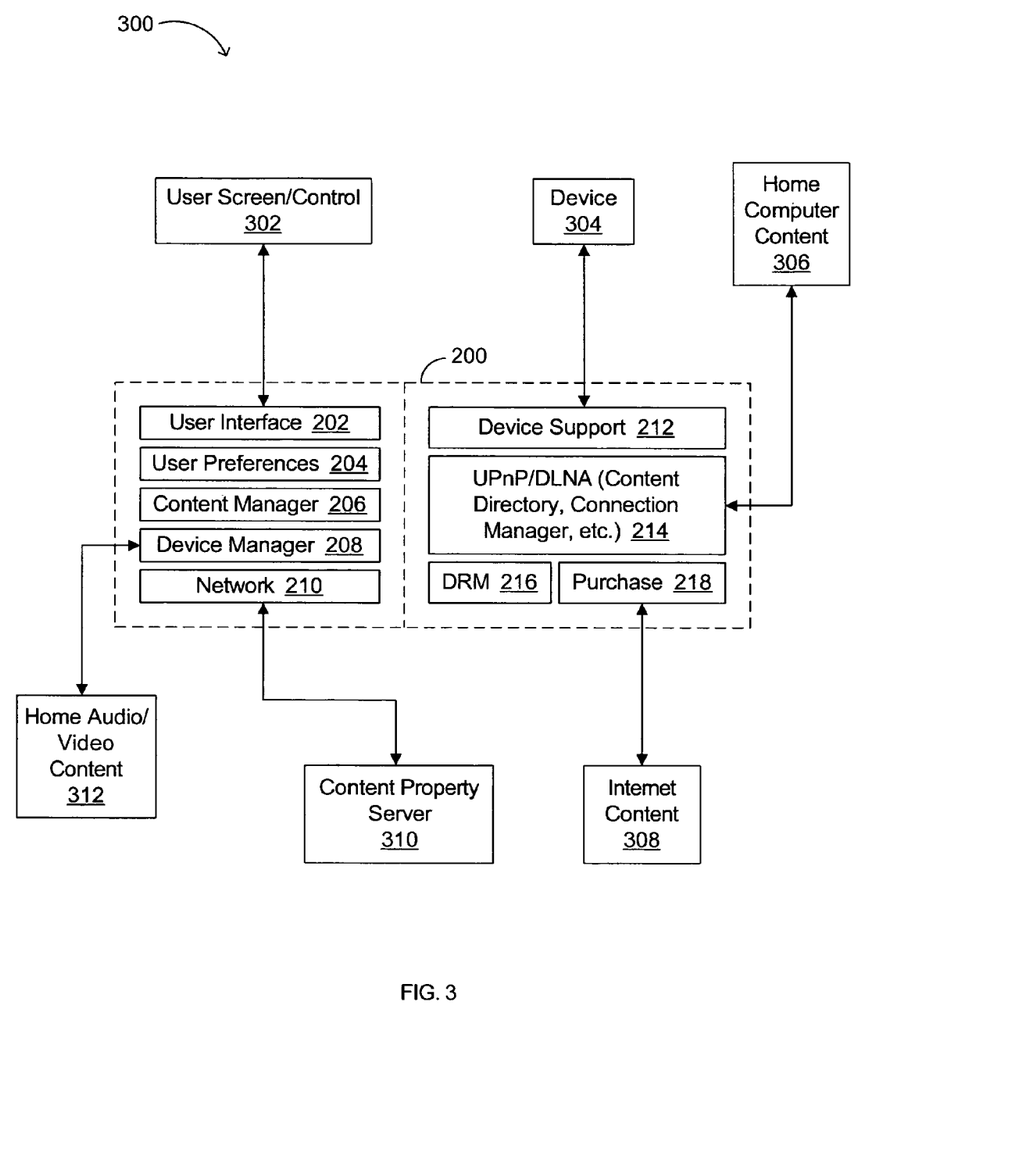
FIG. 3 shows an exemplary interface arrangement suitable for the content selector of FIG. 2.

Referring now to FIG. 3, an exemplary interface arrangement suitable for Content Selector 200 is shown and indicated by the general reference character 300. In this particular example, user input device 202 connects to User Screen/Control 302. A connection can be by wired, wireless, optical, infrared, or other communications. Any suitable interface or protocol can be employed. Similarly, Device 304 connects to Device Support 212. In accordance with various illustrative embodiments, Device 304 is any portable device, such as an MP3 player, or any other suitable device that may dock to Content Selector 200. Home Computer Content 306 connects to UPnP/DLNA (Content Directory, Connection Manager, etc.) 214, for example. Home Computer Content 306 provides, via UPnP/DLNA 214, any home network-based content. Such content access is not limited to MP3 files on a personal computer, but rather may reach any digital form content accessible on a home or local area network (LAN), or any private network, for example.

Internet Content 308 connects to Purchase controller 218. In one embodiment, such Internet content and purchasing controller is implemented using, e.g., SONICSTAGE software associated with the SONY CONNECT content download service (allowing a user to perform various tasks such as downloading, managing, manipulating, reviewing, and reproducing audio data, video data, text data, and graphics data). Purchased content, subject to DRM 216 control, is then added to the user's collection and stored in any suitable device interfacing with Content Selector 200. Accordingly, a user of entertainment system 300 would not have to "re-purchase" the same content at a later time if the user wishes to hear the song again, for example. In this fashion, the system acts as an extension of a home entertainment content collection.

Content Property Server 310 connects via Network 210. In accordance with various illustrative embodiments, a content property server is any commercial database of information associated with CDs, such as the CDDB service offered by the GRACENOTE company of Emeryville, Calif., which is accessible via Hypertext Transfer Protocol (HTTP). CDDB provides song or track information as well as cover art displayable via user input device 202 on User Screen/Control 302, for example. Home Audio/Video (A/V) Content 312 connects via Device Manager 208. The home A/V content includes a stack of CDs, for example. Further, Home A/V Content 312 and Device Manager 208 interface through a Custom Installation System (CIS), or the like, in order to facilitate software-based control of the user's home A/V content that is not stored on a computer or like system, for example.

In one aspect of embodiments of the present invention, a user takes device 300 (or a subset "device" including Content Selector 200 and User Screen/Control 302) to a location that is remote (i.e., geographically distant from) the building or facility in which a computer platform acting as a content server, a content storage manager, or both, is operating. The user then uses device 300 to access the stored content. For example, a user may have a set of content (e.g., a stack of CDs in Home A/V Content 312 or MP3 files stored on Home Computer Content 306) that the user wishes to access while at a friend's house. The user connects device 300 to the Internet (e.g., by means of a wireless connection) so as to access and transfer (e.g., stream) that content to a storage medium at the friend's house. In this fashion, any number of different devices can be accessed via a single interface (e.g., User Screen/Control 302 via User Interface or user input device 202). Once the owner/user removes his device from the friend's home network, the copied content will not be available to another user due to DRM constraints. Accordingly, the copied content will essentially be useless to others and may be removed from the storage in some implementations.

In another aspect of embodiments of the invention, playlists or a list of a set of content requested can be supported. Such a playlist is stored in any of the devices interfacing to Content Selector 200, for example. Further, content from a playlist is transferred between devices or otherwise shared over the Internet at a user's request. For example, one or more users may use Content Selector 200 to select song content (e.g., song 1, song 2, ..., song N). Such a list of songs is stored either in Content Selector 200 or in one or more of the interfacing devices (e.g., Device 304, Home Computer Content 306, etc.). Then, at a later time, this playlist (e.g., playlist A) is recalled and all the associated content (e.g., song 1, song 2, ..., song N) is provided via Content Selector 200. Content of playlist A is accordingly downloaded to any device interfacing with the Content Selector 200. Such a playlist can be reused as many times as a user likes. Also, any number of playlists stored in any interfacing device is accommodated by Content Selector 200 via a playlist recall function.

In another aspect of embodiments of the invention, content which may pass through Content Selector 200 remains substantially in the same digital form or format as in the device in which the content resides. In one embodiment, Content Selector 200 is substantially free of storage for the content. Accordingly, content is instead stored in any of the interfacing devices and passes through Content Selector 200 substantially in the same format as the content is stored. Alternatively, Content Selector 200 could include storage, such as an embedded hard disk, for some or all of the requested content.

Embodiments of the present invention relate to methods for retrieving content in a home entertainment system. For example, a method of retrieving content can include: (i) receiving a request to access media content; (ii) providing a menu showing the requested content is available in a variety of formats with one format stored in a home network and another stored outside of the home network; (iii) receiving a selection of one of the formats; and (iv) providing or outputting the media content in the selected format.

Embodiments of the present invention further relate to using a processor to execute instructions on a machine-readable medium. For example, such instructions can include: (i) one or more instructions for receiving a request to access media content; (ii) one or more instructions for providing a menu showing the requested content is available in a variety of formats with one format stored in a home network and another stored outside of the home network; (iii) one or more instructions for receiving a selection of one of the formats from a user input device; and (iv) one or more instructions for providing or outputting the media content in the selected format Referring now to FIG. 4, a flow diagram illustrating basic steps in using a content selector according to an embodiment is shown and indicated by the general reference character 400. The flow begins in Start 402, and a user accesses the user interface or input device 404. In this example, a request for a particular song (e.g., song X) is made 406. The request includes search priority and/or search parameters that may either be explicitly provided by the user or by way of a default or predetermined setting. If the song X is found 408, a check on whether X is of the appropriate format and/or appropriate ownership is made 412. For example, if a higher quality or alternate format is available and/or desired, the search parameters and/or priority gets adjusted 416 and the flow returns to effectively continue search for song X 406. In an alternate embodiment, the search may be re-initiated by the user, for example. On the other hand, if the format is acceptable to the user and/or for a designated application, the flow completes in End 414. Further, if the search parameters (e.g., as found in User Preferences 204) designate that the highest quality available copy of the requested content be furnished, the user would not be given the option of re-searching based on the format, but rather any additional searching and/or sorting would be done automatically in order to supply the content in the highest quality format available. Accordingly, the system is "content aware" so that a particular format, appropriate ownership and/or quality of the content is used to select the content to supply to the user.

Figure 4:
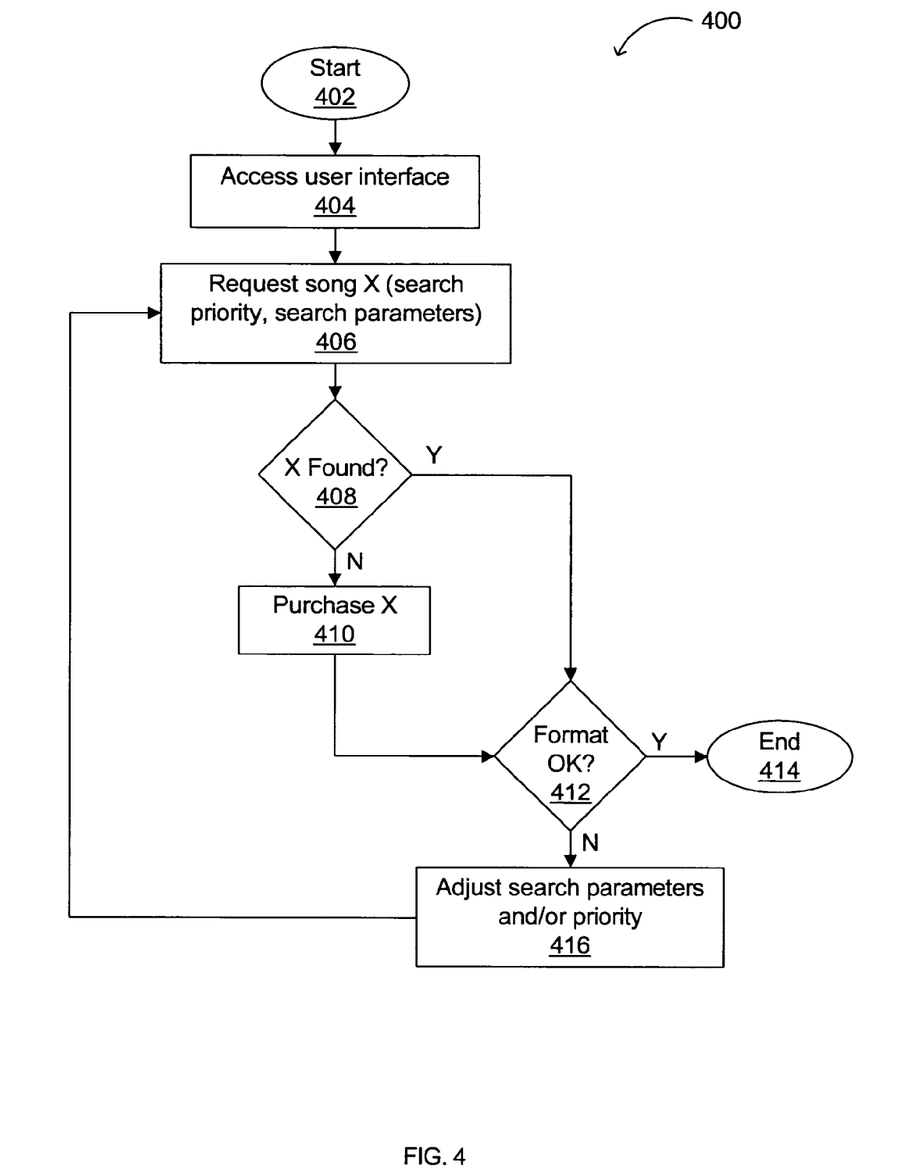
FIG. 4 is a flow diagram illustrating basic steps in using a content selector according to an embodiment.

However, if song X is not found 408, an option to purchase X 410 is provided. In one embodiment, such purchasing is made by traditional credit card payments or other means on either a pay-per-download or a subscription basis, for example. For return customers, credit card information may be stored on the input device itself or simply remembered by the payment service, for example. The purchase option may not be activated unless song X is not found within the content that the user already owns, as accessible via Content Selector 200, as discussed above. As an alternative to providing a purchase option, purchase X 410 may essentially be replaced by an expanded search routine. Such an expanded search can include searching across multiple servers, copies, and/or versions of the requested content.

A format that is higher quality for one designated application may not be so for another application. For example, content constructed by relatively low sampling rates may provide a higher quality format for speedy downloading. Accordingly, a user may seek such a content format over other available formats if the designated application is multiple downloads of the same content and/or highly speed-sensitive downloading. However, for other applications, higher quality formats may mean higher sampling rates and/or slower downloading speeds. In accordance with various illustrative embodiments of the invention, search priority and/or search parameters are used for adaptive selection and rendering of the selected content for any given application.

Figure 5:
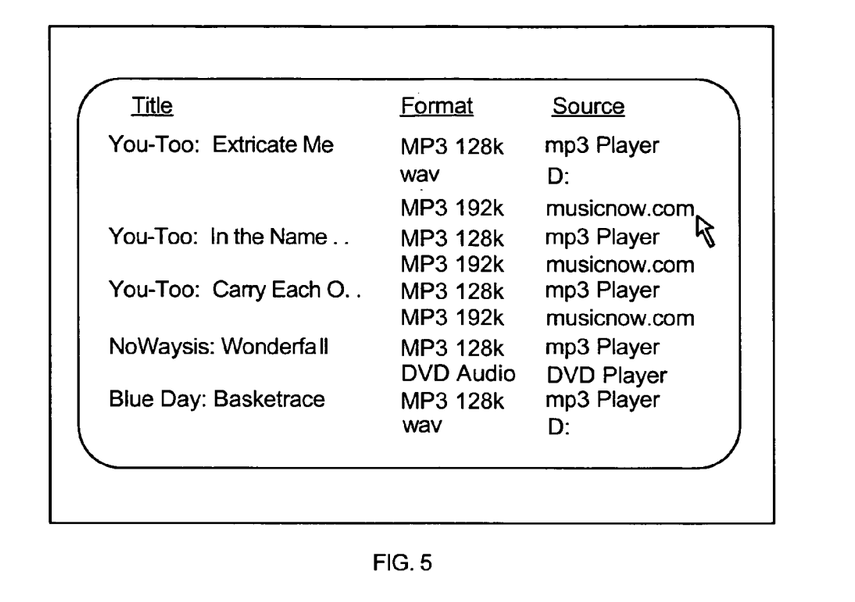
FIG. 5 illustrates a screen display of a user interface or input device.

FIG. 5 illustrates a screen display of a user input device in an embodiment of the invention. In FIG. 5, available song titles are displayed in a left-side column. The titles are displayed along with the artist name. The band "You-Too" has three titles displayed. The center column lists the available formats for each song. Thus, the song "Extricate Me" is available in three different formats: mp3 (at 128 kilo-bits-per-second (kbps) encoding), as a .wav file from the "D" drive on the user's home computer system, or from a commercial website, "musicnow.com" for purchase in the mp3 192 kbps format. Other formats that can be supported according to embodiments include atrac and aiff, for example. The "source" column on the right side shows where the specific format for the song will be obtained. Other formats and sources are possible. For example, other entries in FIG. 5 show a DVD audio format that can be obtained from a DVD player connected to the system.

By selecting (e.g., by using a pointer and clicking a button) one of the formats or sources the user can start playback of the desired song in the desired format from the desired source. If the user selects a format from a source that is local to the user's system then the song is obtained from the appropriate device and played. This approach can also work to obtain songs or other content from external sources such as those sources coupled by wired or wireless connection to a network such as the Internet. If the source is a commercial source, the user is prompted for payment. Alternatively, the user can have an account set up so that the payment step is performed automatically.

The user input device is provided with many types of features, such as allowing a user to set a filter so that only songs of specific artists, formats, sources, etc., are displayed. In one embodiment, a default is set so that if the user does not want to always specify a format or source (when multiple formats or sources are possible), then the system obtains the song from the default source. In general, the functionality of the user input device is achieved with any suitable user input or output devices or controls.

Figure 6:
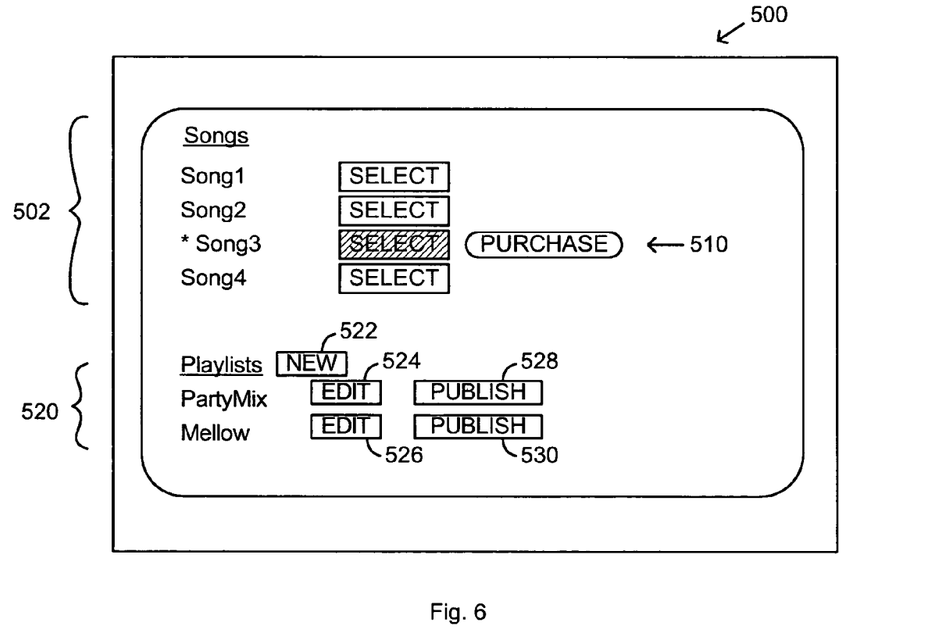
FIG. 6 shows various controls for additional options.

FIG. 6 shows various controls for additional options such as to create and use playlists, make playlists available to others, etc.

In FIG. 6, display 500 includes song titles at area 502. The band name and song are shown in a left column along with a SELECT button. The SELECT button can be activated as, for example, by a user touching the selection on a touch-screen, using a pointer and mouse button, etc. The title at 510 does not have an active SELECT button (the button is "greyed out") since that song title is not available from a source that the user owns (i.e., a source on the user's home network). In this case a PURCHASE button is provided as an option so that the user can select to PURCHASE and download the song from an external source such as the Internet. An icon, different background or text color, animation or any other visual indicator can be used to alert the user that the song is not resident on the home network but can be purchased.

Playlists are shown at 520 with options to create a new playlist (button 522), edit an existing playlist (buttons 524 and 526) and publish a playlist (buttons 528 and 530). Publishing a playlist makes it available to other users or devices. For example, this can allow a user to access the playlist from a friend's portable device, or from a device connected to a friend's home network (i.e., a different home network than the user's home network). Other playlist options and features can be provided. Any suitable type of user interface and display scheme can be used to allow a user to access content titles in the manners described herein.

Although the invention has been described with respect to specific embodiments thereof, these embodiments are merely illustrative, and not restrictive, of the invention. For example, although the invention has been discussed primarily with respect to audio or song content, any type of content and format can be used to provide a user with requested entertainment-based or any type of media content. Features of the invention can be used with fixed or portable devices, different search engines or approaches, remote or local sources, different playback or media presentation devices, or with any suitable present or future process, device or approach even though not specifically mentioned in this specification.

Further, connections can be made and content or data transferred in any number of ways. Any type of device or other source for content can be used with the system described herein. For example, popular hard-disk drive media systems, such as TiVo™ can be used as a content source. Satellite, cable or other distribution can be used to obtain content.

Although specific steps have been discussed as being performed at different sites or by different entities, such steps may be equally effective if performed at a different location or by a different entity. For example, it is possible that a single entity can perform the steps of requesting content. Many variations are possible in accordance with embodiments of the present invention.

Further, any suitable programming language can be used to implement the routines of embodiments of the present invention, including C, C++, Java, assembly language, etc. Different programming techniques can be employed, such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at substantially the same time. In addition, the sequence of operations described herein can be interrupted, suspended, or otherwise controlled by another process, such as an operating system, kernel, etc. The routines can operate in an operating system environment or as stand-alone routines occupying all, or a substantial part, of the system processing.

Although specific types and numbers of interfaces, tools, utilities, routines or other programs and functionality has been presented, the functionality provided by embodiments of the invention can be provided by many different design approaches. For example, more or less than six interfaces can be used with the content selector. Different designs can include combined functionality of several interfaces and/or content storage units into one, for example. It may be possible and desirable to omit functions and/or interfaces described herein in some embodiments. Different embodiments can include more or less automation and more or less manual intervention. Features can be added, deleted, or modified, as, for example, to accommodate future computer operating systems, applications, utilities, drivers or other components.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits (ASICs), programmable logic devices (PLDs), field programmable gate arrays (FPGAs), optical, chemical, biological, quantum or nanoengineered systems, components and mechanisms may be used. In general, the functions of the present invention can be achieved by any means as is known in the art. Distributed, networked systems, and/or components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/FIGS should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method executed by a processor coupled to a display device and to a user input device, the method comprising:
    displaying a list of titles of media content on the display device;
    displaying a first indicator in association with each title in the list,
    wherein the first indicator identifies at least one source for said each title in the list,
    wherein the at least one source includes at least one of at least one internal source and at least one external source, and wherein the at least one external source is accessible through a wide area network;
    displaying a second indicator in association with said each title in the list,
    wherein the second indicator indicates that said each title in the list is available for selection and for purchase when the first indicator identifies the at least one external source,
    wherein the second indicator indicates that said each title in the list is available for purchase at a designated site when said each title is not available locally relative to the processor;
    receiving a request to access a particular title from the list of titles of the media content, wherein the request includes: at least one of search priority and search parameters; or a command to use predetermined settings for said at least one of search priority and search parameters;
    searching for the particular title in accordance with said at least one of search priority and search parameters; and
    displaying a third indicator in association with said each title in the list,
    wherein the third indicator indicates at least one format of said each title in the list.

2. The method of claim 1, further comprising
    adjusting said at least one of search priority and search parameters when a default or alternate format of said each title is shown in said at least one format, and the default or alternate format is desired.

3. The method of claim 1, wherein the second indicator indicates that said each title in the list is available for selection when said each title is available locally relative to the processor.

4. The method of claim 1, wherein said at least one source identifies a portable media device coupled to the processor.

5. The method of claim 1, wherein said at least one source identifies a storage unit coupled to the processor.

6. The method of claim 1, wherein one particular source of said at least one source identifies a remote device or site that is remote relative to the processor.

7. The method of claim 6, further comprising
obtaining a particular title associated with said one particular source from the remote device or site using a network interface.

8. The method of claim 1, wherein the list of titles of the media content and the associated at least one source were obtained as a result of searching locally relative to the processor.

9. A non-transitory tangible storage medium storing a computer program for accessing content from a plurality of content sources, the computer program comprising executable instructions that cause a computer to:
display a list of titles of media content on a display device;
display a first indicator in association with each title in the list,
wherein the first indicator identifies at least one source for said each title in the list,
wherein the at least one source includes at least one of at least one internal source and at least one external source, and wherein the at least one external source is accessible through a wide area network, and
wherein the list of titles of the media content and the associated at least one source were obtained as a result of searching locally relative to the processor;
display a second indicator in association with said each title in the list,
wherein the second indicator indicates that said each title in the list is available for selection and for purchase when the first indicator identifies the at least one external source,
wherein the second indicator indicates that said each title in the list is available for purchase at a designated site when said each title is not available locally relative to the processor;
receive a request to access a particular title from the list of titles of the media content, wherein the request includes:
at least one of search priority and search parameters; or
a command to use predetermined settings for said at least one of search priority and search parameters;
search for the particular title in accordance with said at least one of search priority and search parameters; and
display a third indicator in association with said each title in the list,
wherein the third indicator indicates at least one format of said each title in the list.

10. The storage medium of claim 9, further comprising executable instructions that cause a computer to:
adjust said at least one of search priority and search parameters when a default or alternate format of said each title is shown in said at least one format, and the default or alternate format is desired.

11. A non-transitory tangible storage device storing a computer program for accessing media content from a plurality of content sources, the computer program comprising executable instructions that cause a computer to:
display a list of titles of the media content on a display device;
display a first indicator identifying at least one content source for each title in the list,
wherein at least one of said at least one content source identifies at least one device or site that stores said each title in the list: (1) locally relative to the display device; and (2) externally relative to the display device accessible through a wide area network;
display a second indicator indicating that said each title in the list is available for selection and for purchase when the first indicator identifies the at least one external source,
wherein the second indicator indicates that said each title in the list is available for purchase at a designated site when said each title is not available through a local network coupled to the display device;
receive a request to access a particular title from the list of titles of the media content, wherein the request includes at least one of search priority and search parameters;
search for the particular title in accordance with said at least one of search priority and search parameters; and
display a third indicator in association with said each title in the list, wherein the third indicator indicates at least one format of said each title in the list.

12. The storage device of claim 11, further comprising executable instructions that cause a computer to:
adjust said at least one of search priority and search parameters when a default or alternate format of said each title is shown in said at least one format, and the default or alternate format is desired.

13. The storage device of claim 11, wherein the second indicator indicates that said each title in the list is available for selection when said each title is available through a local network coupled to the display device.

14. The storage device of claim 13, wherein said at least one source identifies a portable media device coupled to the local network.

15. The storage device of claim 13, wherein said at least one source identifies a storage unit coupled to the local network.

* * * * *